United States Patent [19]

Morgan

[11] 4,363,191

[45] Dec. 14, 1982

[54] HINGED WINDOW ASSEMBLY

[75] Inventor: Cleon C. Morgan, Holland, Mich.

[73] Assignee: Donnelly Mirrors, Inc., Holland, Mich.

[21] Appl. No.: 143,127

[22] Filed: Apr. 23, 1980

[51] Int. Cl.³ ............................................. E05D 15/00
[52] U.S. Cl. ........................................ 49/381; 16/225
[58] Field of Search ................................. 49/381, 383; 16/DIG. 13, 150

[56] References Cited

U.S. PATENT DOCUMENTS

| | | | |
|---|---|---|---|
| 1,963,941 | 6/1934 | Duffy | 20/16 |
| 2,436,728 | 2/1948 | Parsons | 296/44 |
| 2,507,965 | 5/1950 | Eichner | 16/150 |
| 2,555,204 | 5/1951 | Surrell | 20/53 |
| 3,032,808 | 5/1962 | Fleming | 16/150 |
| 3,052,496 | 9/1962 | Frey | 296/44 |
| 3,343,867 | 9/1967 | Couch et al. | 16/150 X |
| 3,711,893 | 1/1973 | King | 16/128 |
| 3,806,188 | 4/1974 | Tantlinger | 296/146 |
| 3,881,303 | 4/1975 | Krafka | 16/150 X |

Primary Examiner—Kenneth Downey
Attorney, Agent, or Firm—Price, Heneveld, Huizenga and Cooper

[57] ABSTRACT

A hinged window assembly for vehicles and the like comprises a rigid support having a base fastened to the upper side of a window frame, and a depending flange with a free edge. An edge molding strip envelops the periphery of a window pane, and includes a flexible hinge segment with one portion adhered to the support flange adjacent the free edge thereof to pivotally mount the window pane in the frame. An inner portion of the hinge segment forms a web which extends over and covers the flange interior to the support base, thereby forming a flexible seal. The web is unattached to the interior surface of the support flange, such that the window can be pivoted beyond a normally fully open position to conveniently install the window in the frame without damaging the seal.

25 Claims, 14 Drawing Figures

HINGED WINDOW ASSEMBLY

BACKGROUND OF THE INVENTION

The present invention relates to hinges, and in particular to a hinged window assembly for vehicles, and the like.

Hinged closures, such as doors, windows, and the like, are used in conjunction with vehicles to vent and/or provide access to the vehicle. These hinge arrangements are widely used for mounting side and rear windows in vans, and typically comprise a stainless steel channel which forms an edge molding about the periphery of a pane of glass, or other closure panel. A pair of hinges are mounted at the top of the window frame, and are attached to the stainless steel molding to pivotally suspend the window in place over the window opening. Weather stripping is positioned between the window and the frame to form a weathertight seal therebetween.

The above described hinge arrangements are generally quite expensive and difficult to install. The hinge fasteners can loosen due to the vibration of the vehicle. Further, these hinged structures detract from the overall appearance of the vehicle, and are often considered asthetically undesirable.

SUMMARY OF THE INVENTION

Accordingly the present invention provides a less expensive, substantially weatherproof, relatively easy to install hinged vehicle window assembly especially useful in van-type bodies. The hinged assembly includes a flexible connecting portion or hinge segment, preferably formed from polyvinyl-chloride, which is bonded to portions of a rigid, depending support but unattached to others, and forms a weather seal behind the entire hinge area. This arrangement allows the hinge segment to flex without damage when the window is pivoted to an installation position beyond the fully open position. The installation position exposes an attachment area for insertion of fasteners. Thereafter, when the window is pivoted between normally open and closed positions, the unattached hinge segment portion remains unflexed in a sealing position.

One aspect of the present invention is to provide a hinge for pivoting vehicle windows, comprising a rigid support having a base adapted for connection with the window frame, and a depending flange shaped to extend over and protect an exterior portion of the hinge. Flexible connection means connect the rigid support with a pane of glass, and include a first portion adhered to the flange of the rigid support means adjacent a free edge thereof to pivotally mount the window pane in the frame. A second portion of the connection means is disposed over the normally interior side of the flange, and extends to the base to form a flexible seal between the rigid support means and the window pane. The second portion of the connection means is preferably unattached to the interior of the flange, such that the window can be pivoted beyond a normally fully open position to conveniently install the window in the frame without tearing or otherwise damaging the seal.

The present invention provides a hinged window assembly which securely mounts a window in a frame, and is particularly adapted for pivotally mounting a window in a vehicle. The hinge assembly is preferably oriented such that the window is pivotally suspended from the top of the frame and forms a weatherproof seal between the window and the frame. The window assembly has an integral, one-piece window and hinge unit which is easy to install in a vehicle without damaging the seal. The assembly comprises a rigid support which attaches the window to the frame and protects the hinge, and an edge molding strip with a flexible hinge portion, and a web portion extending over and unattached to a surface of the support channel, thereby permitting the window to be pivoted beyond a normally fully open position during assembly without damaging the seal.

These and other features, advantages, and objects of the present invention will be further understood and appreciated by those skilled in the art by reference to the following written specification, claims and appended drawings.

DETAILED DESCRIPTION OF THE PREFERRED EMBODIMENTS

Figure 1:
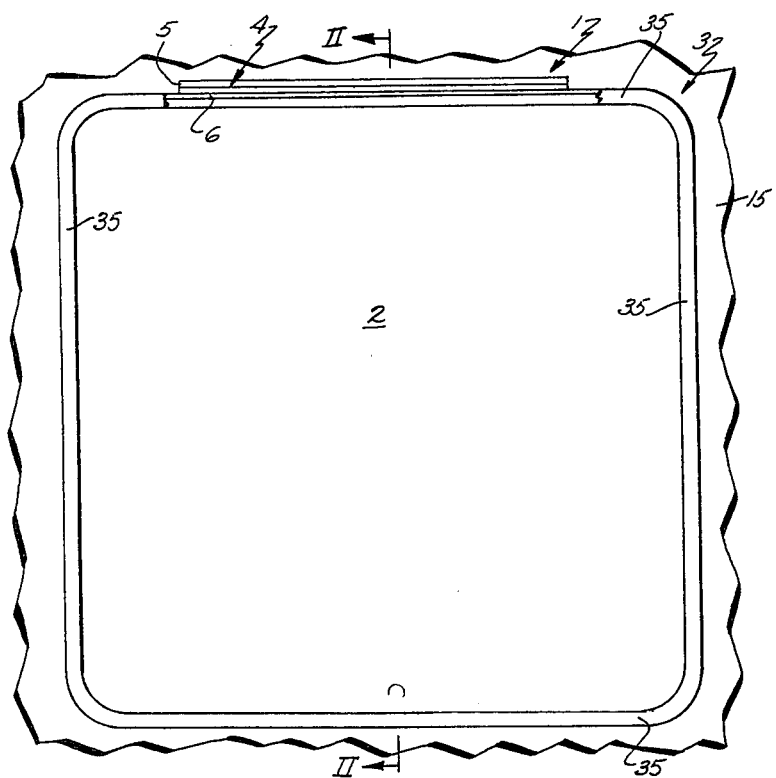
FIG. 1 is a front elevational view of a vehicle window and hinge assembly therefor embodying the present invention, with an upper portion thereof broken away, and shown mounted in a van window frame.
Figures 2, 5, 6:
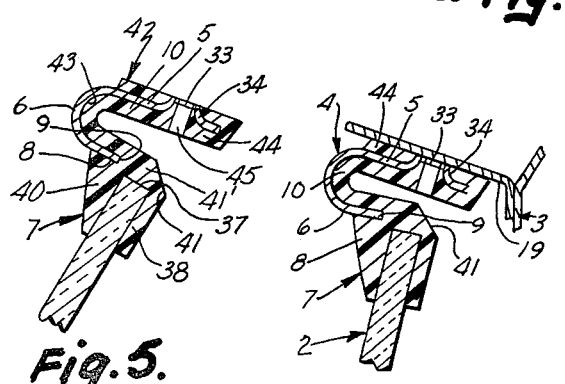
FIG. 2 is an enlarged, fragmentary, vertical cross-sectional view of the hinge assembly taken along the line II—II, FIG. 1, shown in a closed position, with broken lines illustrating an open position.
FIG. 5 is an illustration of the flexible hinge of FIGS. 3 and 4, shown in a free, as molded position.
FIG. 6 is an illustration of the flexible hinge of FIGS. 3, 4 and 5, shown in a normally fully open position.
Figure 7:
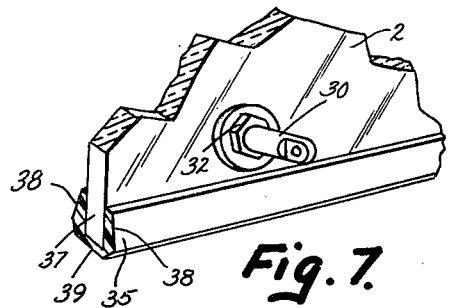
FIG. 7 is a fragmentary, perspective view of a latch portion of the assembly connected with a window pane.

For purposes of description herein, the terms "upper", "lower", "right", "left", "rear", "front", "vertical", "horizontal", and derivatives thereof shall relate to the invention as oriented in FIGS. 1 and 2. However, it is to be understood that the invention may assume various alternative orientations, except where expressly specified to the contrary.

The reference numeral 1 (FIG. 1) generally designates a hinge arrangement embodying the present invention, which is particularly adapted for pivotally mounting a pane of glass 2 in a vehicle window frame 3. It is to be understood, however, that the concepts disclosed herein may be used to hingedly mount other types of closures in various styles of frame structures. Hinge arrangement 1 comprises a rigid support 4 (FIG. 2) having a base 5 adapted for connection with window frame 3, and a flange 6 shaped to extend over and protect an exterior portion of the hinge. A flexible hinge or connection member 7 is connected with glass pane 2, and includes a first portion 8 adhered to support flange 6 adjacent the free end 9 thereof to pivotally mount the window pane in the frame. A second hinge portion 10 is disposed over the interior of support flange 6, and extends to base 5 to form a flexible seal 11 between the support and the window.

As best shown in FIG. 2, the illustrated window frame 3 is formed between the interior and exterior sheet metal side panels 15 of a vehicle, such as a van, bus, tractor, cab, or the like. The interior and exterior panels 15 are bent inwardly and interconnected by welds at the window opening to form a pinch wall flange 16 having an end edge 17 which defines the window opening. Weather stripping 18 is attached to the pinch wall flange 16 to form a seal between the window and the frame. An inwardly inclined sill 19 is formed between the exterior panel 15 of the vehicle and pinch wall flange 16. The hinge arrangement 1 is attached to the upper side 20 of sill 19, such that the entire window assembly is recessed into the side of the vehicle to present a sleek, streamlined appearance.

Figure 8:
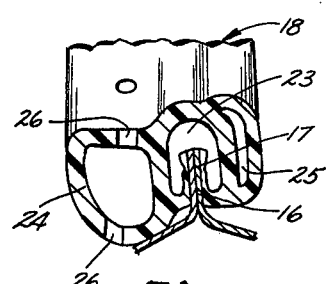
FIG. 8 is an enlarged, vertical cross-sectional view of a seal portion of the window assembly, installed in the window frame.

With reference to FIG. 8, weather stripping 18 is of a conventional, three-bead construction, and extends continuously about the inner periphery of the window opening. Weather stripping 18 has a center compartment 23 in which flange 16 is received and connected by means such as adhesive. Exterior and interior seal compartments 24 and 25 respectively extend laterally from opposite sides of center compartment 23. The weather stripping is resilient, with an installed shape as illustrated in FIG. 8, and apertures 26 through the side walls of exterior bead 24 to permit the same to deform and seal against the window.

A latch 27 (FIG. 2) is attached to window pane 2 along the lower side thereof, and connects the lower, free side of the window pane with window frame 3 to control the pivotal motion of the window. Latch 27 is of a conventional construction, and includes a base 28 fastened to the interior sill portion of frame 3. An over-centered lock 29 is pivotally connected with latch base 28 at its lower end, and with a stud 30 at its upper end. Stud 30 extends through a mating aperture in glass panel 2, and includes an enlarged head 31 and a nut 32 positioned on opposite sides of the glass. Latch 27 has a locked position which is illustrated by the full lines of FIG. 2, wherein window pane 2 is pivoted inwardly against weather stripping 18 to a fully closed position. Latch 27 can be unlocked and extended outwardly to pivot window pane 2 to a normally fully open window position, as illustrated by the broken lines in FIG. 2. When the hinge arrangement is installed in a vehicle, latch 27 prevents the window pane from being pivoted outwardly or open further than the fully open position.

In the embodiment illustrated in FIGS. 1-6, rigid support 4 is generally hook-shaped, with the parallel sides thereof disposed along planes parallel with the upper side of sill 19. Support 4 is constructed of a rigid material, such as steel, or the like, and is capable of securely supporting the pane of glass 2 from the free edge 9 thereof in a suspended fashion. Support base 5 is substantially flat, and includes a plurality of apertures 33 spaced along the length thereof. Frustroconical indentations 34 are formed in support base 5 at each aperture 30, and serve as spacers between support base 5 and window sill 19 to insure that the support and sill are drawn together evenly along the length of the hinge and form a secure seal therebetween. The flange portion 6 of support 4 is arcuate or U-shaped, and is turned inwardly toward the window opening. As best illustrated in FIG. 1, support 4 extends continuously along a major portion of the upper side of the window frame. The illustration support 4 is inclined slightly with sill 19, but is nearly or substantially horizontal in orientation.

An edge molding strip 35 (FIGS. 1 and 2) extends about the periphery of window pane 2, envelops the edge, and is connected with flexible hinge member 7 to pivotally mount the window. Edge molding strip 35 includes an inwardly oriented channel 36 (FIG. 2) in which the outer edge 37 of the window pane is received. In this example, strip 35 includes interior and exterior flanges 38, which are slightly tapered toward the interior of the window pane, and a base 29. Preferably molding strip 35 is molded about and bonded to the outermost periphery of the window pane side faces and the end edge in a manner to be explained hereinafter.

Flexible hinge member 7 (FIG. 3) is molded integrally with the upper leg or side of edge molding strip 35, and is defined herein to include that portion of the molded material which is disposed between the free edge 9 of rigid support 4 and the upper edge of window pane 2, and flexes when the window pane is pivoted with respect to support 4. In the embodiment illustrated in FIGS. 1-6, along hinge 7, exterior flange 38 is substantially triangular in shape at area 40, with the base of the triangle disposed against and adhered to the exterior surface of support flange 6. The interior edge molding flange 38 is flat, with a beveled corner which forms an inclined surface 41 for purposes described below. The thickness of the molded material over the edge of the window pane 2 at area 41' is thicker than at base 39. A channel 42 is positioned between hinge areas 40 and 41' in the upper portion of hinge member 7, and receives therein the free edge 9 of support 4. In the "as molded" position (FIG. 5), the end of channel 42 and the free end 9 of support 4 are disposed slightly above the edge 37 of the window pane.

The interior hinge portion 10 (FIG. 5) is in the nature of a web or strip, which extends over the inside surface 43 of support 4. Base molding 44 extends along both faces of and encloses support base 3, is adhered thereto, and is preferably molded in one piece with flexible hinge member 7 and edge molding 35. Apertures 45 extend along the length of base molding 44 at positions aligned with support apertures 33, and are adapted to receive fasteners 48 (FIG. 4) therethrough to attach the hinge arrangement to the window frame. The edge molding 35, hinge 7 and base molding 44 are preferably integrally molded from a relative soft, flexible synthetic resin material, such as a flexible, thermoplastic, polyvinylchloride, with a durometer of approximately 80. The various parts of hinge assembly 1 are molded together in the configuration shown in FIG. 5.

Figures 3, 4:
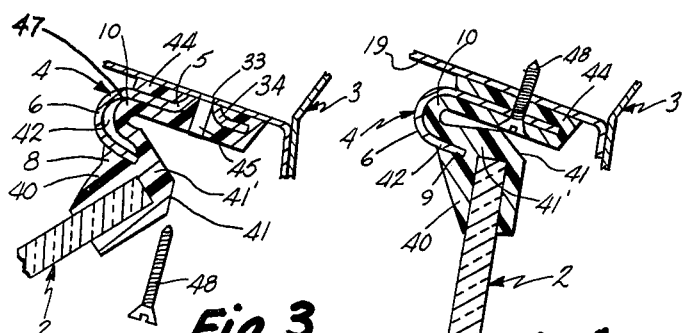
FIG. 3 is an enlarged, vertical cross-sectional view of a flexible hinge portion of the assembly, shown in a position for installation in the window frame.
FIG. 4 is an illustration of the flexible hinge of FIG. 3, shown in a closed window position.

In the embodiment illustrated in FIGS. 1-6, the base of hinge area 40, which forms the lower half of channel 42, is adhered to the exterior surface of support 4 along free edge 9. The manner of adherence, which is discussed in greater detail hereinafter, is permanent, and sufficiently strong to pivotally support the window on support 4 in a suspended fashion from the top of the window frame. The window pane is supported in a cantilevered manner on the end of support flange 6. Because the hinge material is flexible, a "living" hinge is formed which permits the window to move slightly laterally with respect to the frame to improve the seal with weather stripping 18. The web portion 10 of flexible hinge 7 is preferably unattached to the inside surface 43 of support 4 to facilitate installation of the window assembly. In the embodiment illustrated in FIGS. 1-5, web 10 is unattached to the inside surface 43 of support 4 from the lower corner of free edge 9, all the way around the interior of flange 6 to the point 47 where curved flange 6 meets flat base 5 of the support. In the "as molded" position, (FIG. 5), web 10 overlies and follows the contour of surface 43 in an untensed state. In both the fully open window position (FIG. 6) and the fully closed window position (FIG. 4) hinge 7 is closed from the "as molded" position, such that web 10 is compressed and urged abuttingly against surface 43 and forms a secure weathertight seal thereagainst. When window pane 2 is pivoted outwardly beyond the "as molded" position, web 10 is tensed or stretched. Because web portion 10 is unattached to support 4, it can separate or lift off of surface 43, as shown in FIG. 3, thereby enabling the window to be easily installed without breaking or otherwise damaging the seal.

Figure 9:
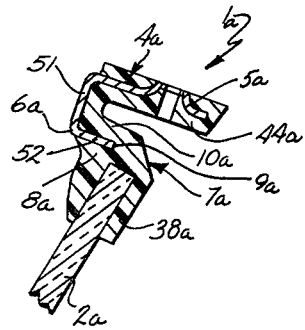
FIG. 9 is a fragmentary, enlarged, vertical cross-sectional view of another embodiment of the hinged window assembly, having a squared support channel, and shown in the free, as molded position.
Figure 10:
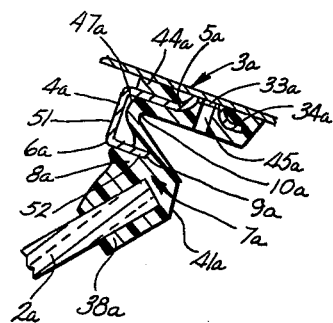
FIG. 10 is an illustration of the hinged window assembly of FIG. 8, shown in the window installation position.
Figure 11:
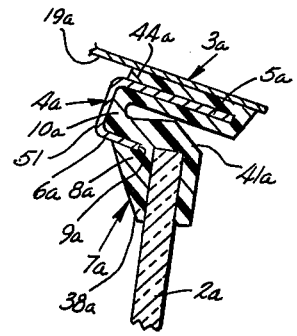
FIG. 11 is another illustration of the hinged window assembly of FIGS. 8 and 9, shown in the closed window position.

The reference numeral 1a (FIGS. 9-11) designates another embodiment of the present invention, wherein the support 4a has a squared-off, channel-shaped construction. Since the hinge arrangement 1a is otherwise similar to the previously described hinge arrangement 1, similar parts appearing in FIGS. 1-6 and 9-11 respectively are represented by the same, corresponding reference numeral, except for the suffix "a" in the numerals of the latter. The flange 6a of support 4a has a medial portion 51 positioned substantially perpendicular to base 5a, and extends in a generally downwardly direction when installed in window frame 3a. Flange 6a includes an inwardly turned end portion 52, which is oriented substantially perpendicular with the medial portion 51 of flange 6a, and parallel with base 5a. The hinge arrangement 1a is otherwise identical with the previously described hinge arrangement, wherein the web portion 10a of flexible hinge 7a is unattached to the interior 43a of rigid support 4a. FIG. 10 illustrates hinge assembly 1a in the installation position, wherein window pane 2a is pivoted outwardly to an extreme position, past the normally fully open window position, to facilitate inserting fasteners through apertures 33a and attaching the assembly to window frame 3a. FIG. 9 illustrates hinge arrangement 1a in the as molded hinge position, and FIG. 11 shows the hinge in the fully closed window position.

Figure 12:
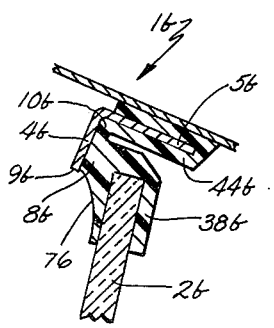
FIG. 12 is a fragmentary, enlarged, vertical cross-sectional view of yet another embodiment of the hinged window assembly, having an L-shaped support channel and shown in the free, as molded position.
Figure 13:
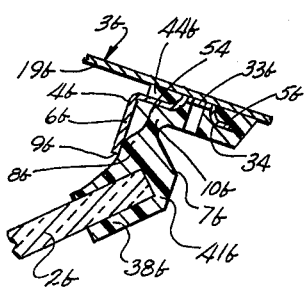
FIG. 13 is an illustration of the hinged window assembly of FIG. 11, shown in the window installation position.
Figure 14:
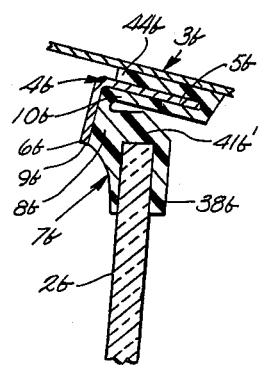
FIG. 14 is an illustration of the hinged window assembly of FIGS. 11 and 12, shown in the closed window position.

The reference numeral 2b (FIGS. 12-14) designates yet another embodiment of the present invention having an L-shaped support 4b. Since hinge arrangement 1b is otherwise similar to the previously described hinge arrangements 1 and 1a, similar parts appearing in FIGS. 1-6, 9-11 and 12-14 respectively are represented by the same, corresponding reference numeral, except for the suffix "b" in the numerals of the latter. The support flange 6b is flat, extends perpendicularly from support base 5b, and is oriented substantially downwardly when installed in window frame 3b. Flexible hinge member 7b is bonded to support 4b along a narrow strip or band adjacent the free edge 9b of the flange. Hinge member 7b is otherwise unattached to the interior surface of flange 6b, and is also unattached to the outer portion of the lower surface of base 5b. Hinge member 7b is bonded to the lower surface of base 5b beginning at a point 54. In the installation position (FIG. 13) a triangularly shaped cavity is formed between support 4a and hinge member 7b. FIG. 14 illustrates hinge assembly 1b in the closed window position, and FIG. 12 illustrates the hinge assembly in the as molded position.

Hinge arrangement 1 (FIGS. 1-6) is preferably manufactured in the following manner. A rigid support frame 4, and a preformed window pane 2 are positioned into a molding machine (not shown) designed to integrally mold flexible PVC about the parts. A bonding primer is applied along the periphery of each window pane on both the interior and exterior surfaces, and at the terminal edge, as well as to both surfaces of the flat base portion 5 of rigid support 4. Primer is also applied to the exterior face of the curved flange 6 from the free edge 9 outwardly to a predetermined point at which hinge member 8 is adhered thereto. Primer is not applied to the interior surface of the curved flange portion 6 of support 4, or to the free edge 9 thereof. A flexible polyvinylchloride (PVC) is then molded over the perimeter of the glass panel to form edge molding strip 35, along the top edge thereof to form hinge member 7, and over the support base 5. The PVC material bonds to only those areas which have been previously coated with the bonding primer. Hence, although hinge web 10 overlies the inside surface 43 of the support flange, and is molded thereover, it is not attached to the support. The hinge and glass panel assembly is then removed from the molding machine and is ready to be installed in a vehicle.

The fabrication of hinge arrangements 1a and 1b is accomplished in a similar manner, with primer being applied only to those portions of the support which are adhered to the hinge member.

To install hinge arrangement 1 in a vehicle, the assembler first positions base 5 along the upper side of window frame 3. The window is then pivoted outwardly to the extreme installation position illustrated in FIG. 3, which permits the operator to insert fasteners 48 through apertures 33, and screw the same into sill 22 to attach the hinge and window to the frame. The fasteners 48 preferably have a countersunk head so as not to interfere with the pivoting motion of the window. The enlarged fastener heads mold the PVC material thereabout as they are driven into the hinge to form a weathertight seal. The fasteners draw the hinge base against the sill until the bases of frustroconical indentations 34 engage the sill, thereby insuring uniform draw down and secure sealing pressure between the base molding and the window sill. The truncated corner 41 of the molding assembly facilitates insertion of fasteners 48 without interference. In the installation position (FIG. 3), the web portion 10 of hinge member 7 pulls away from the interior surface 43 of rigid support 4 to permit the window to be so pivoted without breaking, stretching, or otherwise damaging the seal. After all of the fasteners 48 have been inserted, window pane 2 is pivoted inwardly to the closed position (FIG. 4) wherein hinge member 7 pivotally supports the window in a suspended fashion along the top edge of the window pane. Latch 27 is then connected with window pane 2 and the inner portion of the sill, along their lower edges.

As illustrated by the full lines in FIG. 2, when the window is in the fully closed position, latch 27 is locked, and the edge molding strip 35 abuts weather stripping 18 and forms a seal therewith. In this position, the upper corner of beveled surface 41 (FIG. 4) is disposed adjacent to the lowermost surface of base molding 44, and web 10 overlies the interior surface 43 of support 41 in a compressed state. When the window is swung open to the fully open position, illustrated by the phantom lines in FIG. 2, the hinge 7 diverges from support base 5. Web 10 generally remains abuttingly overlying the interior surface of support 4, and is slightly compressed.

In the foregoing description, it will be readily appreciated by those skilled in the art that modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows:

1. A hinge for pivoting vehicle windows and the like, comprising:

rigid support means for supporting a vehicle window, said support means having a base adapted for connection with a window frame, and a body extending rigidly from said base and shaped to extend over and protect an exterior portion of said hinge;

flexible connection means for connecting said rigid support means with a pane of glass, said connection means including a first portion adhered to one area of said body of said rigid support means adjacent a free edge thereof to pivotally mount the window pane in the frame, and a second portion disposed over another area of the body of said rigid support means and extending from said first portion to said base to form a flexible seal between said rigid support means and the window; and wherein said second portion of said connection means is unattached to said other area of said support means body, and can flex away from said other area when the window pane is pivoted to a position beyond a normally fully open window position such that the base of said rigid support means can be attached to the window frame without damaging said seal.

2. A hinge as set forth in claim 1, wherein:
said rigid support means is generally U-shaped, with said free edge oriented inwardly along a substantially horizontal plane; and
said connection means includes a channel in which the free end of said rigid support means is received and retained.

3. A hinge as set forth in claim 1, wherein:
said rigid support means is generally L-shaped, with said free edge oriented downwardly, and said connection means second portion extending over the interior of said support means.

4. A hinge as set forth in claim 1, wherein:
said second portion extends over a surface of said support means facing inwardly toward the window opening over which the vehicle window is adapted to be supported.

5. A hinge as set forth in claim 4, wherein:
said second portion follows the contour of and engages said inwardly facing surface when the window is in a normally open position or in a closed position, but flexes away from said inwardly facing surface when the window is pivoted beyond the normally fully open position.

6. A hinge for pivoting vehicle windows and the like, comprising:
a rigid support having a base adapted for connection with a window frame, and including a free edge;
an edge molding strip shaped to extend about the periphery of a window pane, and including a flexible hinge segment having a first portion connected to one surface of said support adjacent said free edge, and a second portion covering another surface of said support opposite said one surface and extending continuously to said base to form a flexible seal between said support and the window pane, and pivotally interconnect the same; said flexible hinge having an exterior side; and
a rigid flange connected with said hinge and overlying the exterior side of said hinge to protect the same.

7. A hinge for pivoting vehicle windows and the like, comprising:
a rigid support having a base adapted for connection with a window frame, and including a free edge;
an edge molding strip shaped to extend about the periphery of a window pane, and including a flexible hinge segment having a first portion connected to one surface of said support adjacent said free edge, and a second portion covering another surface of said support opposite said one surface and extending continuously to said base to form a flexible seal between said support and the window pane, and pivotally interconnect the same; and wherein
said hinge segment second portion is unattached to the other surface of said support and can flex away therefrom when the window pane is pivoted to a position beyond a normally fully open window position, such that the base of said rigid support can be attached to the window frame without damaging the seal.

8. A hinge for pivoting vehicle windows and the like, comprising:
a rigid support having a base adapted for connection with a window frame, and including a free edge;
an edge molding strip shaped to extend about the periphery of a window pane, and including a flexible hinge segment with a channel in which the free edge of said support is received; said hinge segment having a first portion adhered to one side of said support adjacent said free edge, and a second portion disposed over the other side of said support and extending to said base to form a flexible seal between said support and the window pane; and wherein
said molding second portion is unattached to said support other side.

9. A hinge as set forth in claim 8, wherein:
said support is generally U-shaped with said free edge normally oriented substantially horizontal.

10. A hinge for pivoting vehicle windows and the like, comprising:
a rigid support having a base adapted for connection with an upper side of a window frame, and including a free edge which extends inwardly toward the window frame along a substantially horizontal plane; and an edge molding strip shaped to extend about the periphery of a window pane, and including a flexible hinge segment with a channel in which the free edge of said support is received to pivotally support the window pane at the upper side of the window frame; said hinge segment having a first portion adhered to one side of said support, and a second portion covering the other side of said support and extending continuously to said base to form a flexible seal between said support and the window pane, and pivotally interconnect the same.

11. A hinge as set forth in claim 10, wherein:
said hinge second portion is unattached to said support other side, thereby permitting said window pane to be pivoted beyond a normally fully open window position for inserting fasteners through said base into the window frame without damaging said seal.

12. A hinge as set forth in claim 11, wherein:
said support is generally U-shaped.

13. A hinge as set forth in claim 10, wherein:
said one support side is disposed on an outside surface of said support, and said other support side is disposed on an inside surface of said support.

14. A hinge as set forth in claim 10, including:
a base molding strip extending along said support base on both faces thereof.

15. A hinge as set forth in claim 14, wherein:
said edge and base molding strips are one-piece, and integrally molded about said support.

16. A hinge as set forth in claim 15, wherein:
said edge molding strip includes an inwardly oriented, U-shaped channel shaped to receive the outer edge of the window pane therein.

17. In a pivoting window assembly for vehicles and the like, an integral hinge and edge molding arrangement, comprising:
a window pane;
a rigid support having a base adapted for connection with an upper side of a window frame, and including a free edge adapted to extend toward the window frame along a substantially horizontal plane; and
an edge molding strip extending about and enveloping the periphery of said window pane, and including a flexible hinge segment with a channel in which the free edge of said support is received to pivotally support said window pane at the upper side of said window frame; said hinge segment having a first portion adhered to an exterior side of said support, and an integrally formed second portion disposed over an interior side of said support and extending to said base, thereby forming a flexible seal between said support and said window pane.

18. A window assembly as set forth in claim 17, including:
a window frame surrounding said window pane; and
a latch connected between lower portions of said window frame and said window pane, and normally restricting window pivoting between a fully open and a fully closed position.

19. A window assembly as set forth in claim 18, wherein:
said hinge second portion is unattached to the interior side of said support other side, thereby permitting said window pane to be pivoted outwardly to a position beyond said fully open position, thereby providing access to insert fasteners through said base into the window frame to install said window frame without damaging said seal.

20. A hinge as set forth in claim 19, wherein:
said support is generally U-shaped.

21. A hinge as set forth in claim 20, wherein:
said support base is encased in a base molding which is connected with said hinge second portion and formed in one-piece with said edge molding strip.

22. In a pivoting window assembly for vehicles and the like, the improvement comprising an integral hinge and edge molding arrangement including:
a rigid L-shaped support having a base connected with an upper side of a window frame, and a downwardly disposed flange with a free edge;
an edge molding strip extending about and enveloping the periphery of a window pane; said molding strip including a flexible hinge segment having a lower, exterior portion thereof adhered to an interior surface of said support flange adjacent the free edge thereof to pivotally support said window pane at the upper side of said window frame, and an integrally formed interior portion disposed over an interior side of said support and extending continuously to said base to form a flexible seal between said support and said window frame; and wherein
said hinge segment interior portion is unattached to that area of said flange disposed from adjacent said free edge to said base, thereby permitting said window pane to be pivoted to a position beyond a normally fully open window position for attaching said support base to the upper side of said window frame.

23. In a pivoting window assembly for vehicles and the like, the improvement comprising a hinge arrangement including:
a rigid L-shaped support having a base connected with an upper side of a window frame, and a downwardly disposed flange with a free edge;
a flexible hinge segment having a lower, exterior portion thereof adhered to an interior surface of said support flange adjacent the free edge thereof to pivotally support said window pane at the upper side of said window frame, and an integrally formed interior portion disposed over an interior side of said support and extending continuously to said base to form a flexible seal between said support and said window frame; and wherein
said support flange extends over and covers the exterior portion of said flexible hinge segment to protect said hinge.

24. A pivoting window assembly as set forth in claim 23, wherein:
said support flange free edge is positioned generally coplanar with an adjacent edge portion of the periphery of said window pane.

25. A window assembly as set forth in claim 24, wherein:
said hinge segment interior portion is unattached to that area of said flange disposed from adjacent said free edge to said base, thereby permitting said window pane to be pivoted to a position beyond a normally fully open window position for attaching said support base to the upper side of said window frame.

* * * * *

UNITED STATES PATENT AND TRADEMARK OFFICE
CERTIFICATE OF CORRECTION

PATENT NO. : 4,363,191
DATED : December 14, 1982
INVENTOR(S) : Cleon C. Morgan

It is certified that error appears in the above-identified patent and that said Letters Patent is hereby corrected as shown below:

Column 10, Claim 23, Line 45:

"said window pane" should be --a window pane--

Signed and Sealed this

Seventeenth Day of May 1983

[SEAL]

Attest:

DONALD J. QUIGG

Attesting Officer

Acting Commissioner of Patents and Trademarks